US012123367B2

(12) United States Patent
Conen et al.

(10) Patent No.: US 12,123,367 B2
(45) Date of Patent: Oct. 22, 2024

(54) METHOD AND DEVICE FOR CONTROLLING AN AIR CHARGE OF AN INTERNAL COMBUSTION ENGINE

(71) Applicant: Robert Bosch GmbH, Stuttgart (DE)

(72) Inventors: Lea Conen, Stuttgart (DE); Christoph Schweizer, Tamm (DE); Fei Sun, Shanghai (CN)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/146,847

(22) Filed: Dec. 27, 2022

(65) Prior Publication Data

US 2023/0220808 A1 Jul. 13, 2023

(30) Foreign Application Priority Data

Jan. 7, 2022 (DE) ..................... 10 2022 200 111.7

(51) Int. Cl.
*F02D 41/00* (2006.01)
*F02D 41/14* (2006.01)

(52) U.S. Cl.
CPC .. *F02D 41/0002* (2013.01); *F02D 2200/0402* (2013.01); *F02D 2200/0406* (2013.01)

(58) Field of Classification Search
CPC .... F02D 11/105; F02D 41/00; F02D 41/0002; F02D 41/14; F02D 41/1401; F02D 2200/0402; F02D 2200/0406; F02D 2200/101; F02D 2041/001; F02D 2041/1409; F02D 2041/141; F02D 2041/1434; F02D 41/18; F02D 9/105; F02D 11/10; F02D 2011/102; F02M 35/10386
USPC ................................ 701/101–105; 123/399; 73/114.31–114.34, 114.37
See application file for complete search history.

(56) References Cited

U.S. PATENT DOCUMENTS

| | | | | |
|---|---|---|---|---|
| 11,434,843 | B1 * | 9/2022 | Baramov | F02D 41/0007 |
| 2006/0011178 | A1 * | 1/2006 | Wild | F02D 13/0219 123/568.16 |
| 2010/0023243 | A1 * | 1/2010 | Heinkele | F02D 41/222 123/184.56 |
| 2015/0260112 | A1 * | 9/2015 | Liu | F02D 41/18 123/350 |

* cited by examiner

*Primary Examiner* — Logan M Kraft
*Assistant Examiner* — Johnny H Hoang
(74) *Attorney, Agent, or Firm* — NORTON ROSE FULBRIGHT US LLP; Gerard A. Messina

(57) ABSTRACT

A method for operating an internal combustion engine based on a control of a supplied fresh air quantity, the method comprising the following steps: implementing an adjustment of a throttle valve for the control of the supplied fresh air quantity as a function of a setpoint mass flow via the throttle valve; determining the setpoint mass flow via the throttle valve according to a differential equation, which is a function of a control deviation ascertained as a function of a setpoint intake manifold pressure and an actual intake manifold pressure.

8 Claims, 2 Drawing Sheets

METHOD AND DEVICE FOR CONTROLLING AN AIR CHARGE OF AN INTERNAL COMBUSTION ENGINE

CROSS REFERENCE

The present application claims the benefit under 35 U.S.C. § 119 of German Patent Application No. DE 10 2022 200 111.7 filed on Jan. 7, 2022, which is expressly incorporated herein by reference in its entirety.

FIELD

The present invention relates to internal combustion engines and especially to operating methods for internal combustion engines in which an air charge in a cylinder of an internal combustion engine is to be adjusted to a setpoint charge with the aid of a closed-loop control.

BACKGROUND INFORMATION

Internal combustion engines are supplied with fresh air via an air supply system. The air mass flow is adjusted via a throttle valve situated in the air supply system.

The throttle valve can be adjusted in a variable manner so that a flow cross-section in the air supply system is selectively modifiable and a desired quantity of fresh air is able to be conveyed to the internal combustion engine. The throttle valve is adjusted according to a setpoint air charge in the cylinder as a function of an operating point of the internal combustion engine.

The adjustment of a setpoint position of the throttle valve is implemented based on a setpoint mass flow via the throttle valve, which is determined by a stationary term that depends only on the desired air charge, and by a controller term, which is a function of a deviation between a setpoint and an actual air charge.

SUMMARY

According to the present invention, a method for operating an internal combustion engine based on a control of a supplied fresh air quantity, and a corresponding device are provided.

Example embodiments of the present invention are disclosed herein.

In the conventional manner, the setpoint mass flow $\dot{m}_{ThrVlv}{}^{des}$ via the throttle valve is utilized as an essential input variable for the setpoint angle of the throttle valve. It is calculated in the engine control device in the following manner:

$$\dot{m}_{ThrVlv}^{des} = umsrln \cdot rl^{des} + \left(\frac{k_{sr}}{fupsrl \cdot \tau^{des}} - umsrln\right)(rl^{des} - rl)$$

where

- umsrln corresponds to a conversion factor of the mass flow as a function of the rotational speed into a charge $umsrln = f(n_{eng}, n_{cyl}, V_h{}^{total})$, where $n_{eng}$ is the engine speed, $n_{cyl}$ is the cylinder number, and $V_h{}^{total}$ is the displacement volume.

$$k_{sr} = \frac{V_{sr}}{T_{sr} R},$$

with $V_{sr}$ corresponding to the intake manifold volume, $T_{sr}$ to the temperature in the intake manifold, and $$R = 2{,}872 \frac{h\ \mathrm{Pa}\ m^3}{kg\ K}$$

to the ideal gas constant,

- rl corresponds to the relative actual charge in the cylinder,
- $rl^{des}$ corresponds to the setpoint charge in the cylinder,
- fupsrl corresponds to the conversion factor of the pressure into a charge as a function of a displacement volume, $V_h{}^{total}$, the intake valve timing (intake valve opening instant) and the discharge valve timing (discharge valve closing instant), and the temperature downstream from the intake valve, and
- $\tau^{des}$ corresponds to the setpoint time constant for the controller.

The calculation of the setpoint mass flow via the throttle valve is thus made up of a stationary term, which is a function of only the desired charge, and a controller term, which is a function of the deviation between the setpoint and the actual charge.

Assuming a linear error dynamic, that is, $$\dot{e}_{rl} + \frac{1}{\tau^{des}} e_{rl} = 0,$$

with $e_{rl} = rl^{des} - rl$, the setpoint mass flow via the throttle valve results as $$\dot{m}_{ThrVlv}^{des} = umsrln \cdot rl^{des} + \left(\frac{k_{sr}}{fupsrl \cdot \tau^{des}} - umsrln\right)(rl^{des} - rl) + \frac{k_{sr}}{fupsrl}\frac{d}{dt}rl^{des} - \frac{k_{sr}}{fupsrl^2} \cdot \frac{d}{dt} fupsrl \cdot rl^{des} + k_{sr}\frac{d}{dt}p_{rg} + \frac{k_{sr}}{fupsrl^2} \cdot \frac{d}{dt} fupsrl \cdot (rl^{des} - rl$$

where $p_{rg}$ corresponds to the partial pressure of the internal residual gas in the combustion chamber.

The partial pressure $p_{rg}$ is ascertained by the charge acquisition or charge ascertainment as a function of an intake and discharge valve timing, an exhaust gas counterpressure as well as an intake manifold pressure in order to allow for an ascertainment of the fresh air charge in the cylinder or the gas mass flow into the cylinder(s).

The conventional control function in particular leads to a linear error dynamic only if, for one, the setpoint charge is constant and its time derivation thus becomes $$\frac{d}{dt} rl^{des} = 0$$

and, for another, the valve timing is constant and the following therefore applies:

$$\frac{d}{dt} fupsrl = \frac{d}{dt} p_{rg} = 0.$$

Both the conversion factor fupsrl and the partial pressure $p_{rg}$ are not solely dependent on the valve timing. It is therefore not possible to directly infer constant fupsrl and $p_{rg}$ from a constant valve timing. However, since both values are heavily influenced by the valve timing, a constant valve timing in practice is usually a prerequisite for constant fupsrl and $p_{rg}$.

Since both values are greatly influenced by the valve timing, however, a constant valve timing in practice is usually a prerequisite for the constant conversion factor fupsrl and constant partial pressure $p_{rg}$.

The assumption with regard to the valve timing was adequate for current approaches because camshaft actuators were slow, and fully variable lift systems did not exist. However, more and more fully variable valve lift systems are provided for modern internal combustion engines so that the current, afore-described control approach is suitable only to a limited extent.

According to a first aspect of the present invention, a method for operating an internal combustion engine is provided based on a control of a supplied fresh air charge. According to an example embodiment of the present invention, the method includes the following steps:

Implementing an adjustment of a throttle valve for the control of the supplied fresh air quantity as a function of a setpoint mass flow via the throttle valve;

Determining the setpoint mass flow via the throttle valve according to a differential equation, which is a function of a control deviation ascertained as a function of a setpoint intake manifold pressure and an actual intake manifold pressure.

In addition, according to an example embodiment of the present invention, the differential equation may be a function of a modified setpoint intake manifold pressure, which is calculated using a predefined setpoint intake manifold pressure and a transfer function, which takes a limited dynamic of the adjustment of the throttle valve into account.

The afore-described alternative control strategy is based on an intake manifold control.

If a linear error dynamic according to $$\dot{e}_{sr} + \frac{1}{\tau^{des}} e_{sr} = 0$$

is taken into account in the differential equation, with $e_{sr} = p_{sr}^{des} - p_{sr}$ of the control deviation, where $p_{sr}^{des}$ corresponds to a setpoint intake manifold pressure and $p_{sr}$ to an actual intake manifold pressure, and $\tau^{des}$ corresponds to a predefined time constant, then a model which may be developed in the following manner can result:

$$\dot{m}_{ThrVlv}^{des} = k_{sr} \cdot \frac{d}{dt} p_{sr}^{des} + (p_{sr}^{des} - p_{rg}) \cdot fupsrl \cdot umsrln + \left( \frac{k_{sr}}{\tau^{des}} - fupsrl \cdot umsrln \right) (p_{sr}^{des} - p_{sr})$$

To this end, the differential equation may be a function of the partial pressure $p_{rg}$ of the internal residual gas in a combustion chamber of the cylinder, the partial pressure of the internal residual gas in particular being determined in a conventional manner as a function of an intake valve opening instant and/or a discharge valve closing instant. The intake valve opening instant is able to be varied by a variable camshaft adjustment.

It is clear that the partial pressure of the internal residual gas in the combustion chamber and the conversion factor fupsrl of a pressure into a charge correspond to a non-differentiated sum term and thus numerically stable even at a high dynamic of a camshaft adjustment.

Especially the derivation of the setpoint intake manifold pressure $$\frac{d}{dt} p_{sr}^{des},$$

which is required to calculate the setpoint mass flow $\dot{m}_{ThrVlv}^{des}$ via the throttle valve, in practice may lead to an unsteady behavior of the setpoint mass flow $\dot{m}_{ThrVlv}^{des}$ insofar as even minor fluctuations of the setpoint intake manifold pressure may lead to larger fluctuations of the derivation or to an imprecise calculation. A balance between the robustness/stability such as with regard to noisy sensor signals and the accuracy of the selected calculation method must be found in the numerical calculation of a derivation.

In addition, the system is unable to follow abrupt jumps of the setpoint intake manifold pressure in response to a load change, regardless of the selection of the desired time constant $\tau^{des}$.

According to one embodiment of the present invention, the transfer function may model a PTn behavior, with n>=1, and has a time constant, which is selected in such a way that it defines a dynamic which is equal to or less than the maximum dynamic of the adjustment of the throttle valve by a throttle valve actuator.

A non-realizable specification for the throttle valve actuator leads to a control deviation of the intake manifold pressure that must be compensated for by the P-component of the controller. However, if the trajectory of the setpoint intake manifold pressure is suitably selected such that it is able to be realized by the air system, then the characteristic of the intake manifold pressure is known at all times and able to be utilized as a prediction for further functions as well. The proportional controller component is then used only to compensate for deviations between the model forming the basis of the pilot control and the reality. For these reasons, the setpoint intake manifold pressure is not directly used for the control but is filtered in order to achieve a better control behavior.

According to an example embodiment of the present invention, the control on the basis of the intake manifold pressure furthermore offers an advantage that no derivations of the conversion factor fupsrl and the partial pressure $p_{rg}$ arise and must be calculated. This makes it easier to calculate the control based on the intake manifold pressure because only the derivation of the setpoint intake manifold pressure $p_{sr}^{des}$ is required. In the discretization in a control unit, the inaccuracies caused by discretization errors are therefore lower in the approximation of the derivations.

According to an example embodiment of the present invention, it may be provided that the adjustment of the throttle valve for the control of the supplied fresh air quantity is implemented using a pilot control and a control for ascertaining two terms, the control being carried out as a function of the setpoint intake manifold pressure and an actual intake manifold pressure.

According to a further aspect of the present invention, a device for operating an internal combustion engine based on a control of a supplied fresh air quantity is provided. According to an example embodiment of the present invention, the device is designed to:

implement an adjustment of a throttle valve for the control of the supplied fresh air quantity as a function of a setpoint mass flow via the throttle valve;

determine the setpoint mass flow via the throttle valve according to a differential equation, which is a function of a control deviation ascertained as a function of a setpoint intake manifold pressure and an actual intake manifold pressure.

BRIEF DESCRIPTION OF THE DRAWINGS

In the following text, example embodiments of the present invention will be described in greater detail based on the figures.

DETAILED DESCRIPTION OF EXAMPLE EMBODIMENTS

Figure 1:
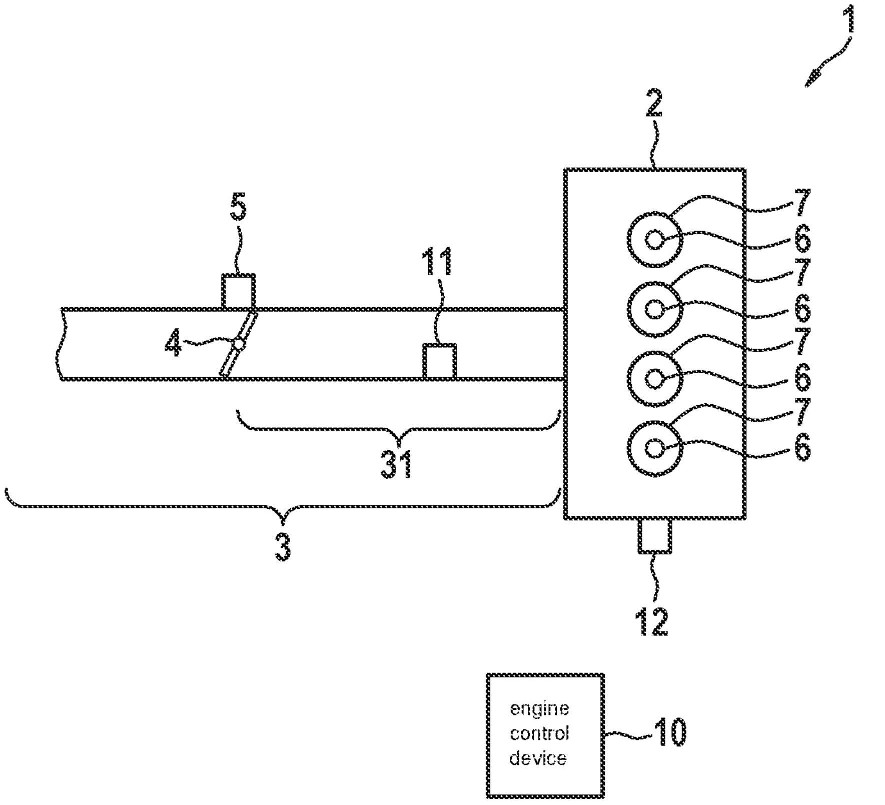
FIG. 1 shows a schematic representation of an engine system having an internal combustion engine.

FIG. 1 schematically shows the design of an engine system 1 including an internal combustion engine 2. Internal combustion engine 2 may be developed as an air-controlled internal combustion engine, in particular a gasoline engine. Fresh air is conveyed to internal combustion engine 2 via an air supply system 3.

Situated in the air supply system is a throttle valve 4, which is adjustable in a variable manner with the aid of a throttle valve actuator 5. An intake manifold section 31 is provided between throttle valve 4 and one or more intake valve(s) 6 of a cylinder 7 of internal combustion engine 2. The cylinder volume and the pressure in intake manifold section 31 define the gas quantity drawn into internal combustion engine 2 as a function of its engine speed.

Internal combustion engine 2 is operated by an engine control device 10, which, in a conventional manner, determines a setpoint air charge in internal combustion engine 2 as a function of a desired setpoint engine torque. In general, the air charge corresponds to the fresh air quantity admitted or drawn into respective cylinder 7 of internal combustion engine 2 per working cycle.

Engine control device 10 operates internal combustion engine 2 based on the system variables such as an intake manifold pressure, which is able to be measured with the aid of an intake manifold pressure sensor 11 or can be modeled in some other manner, an engine speed $n_{eng}$ measured by an engine speed sensor 12, a displacement $V_h^{total}$, and it adjusts a throttle valve position via throttle valve actuator 5 according to a charge control.

Figure 2:
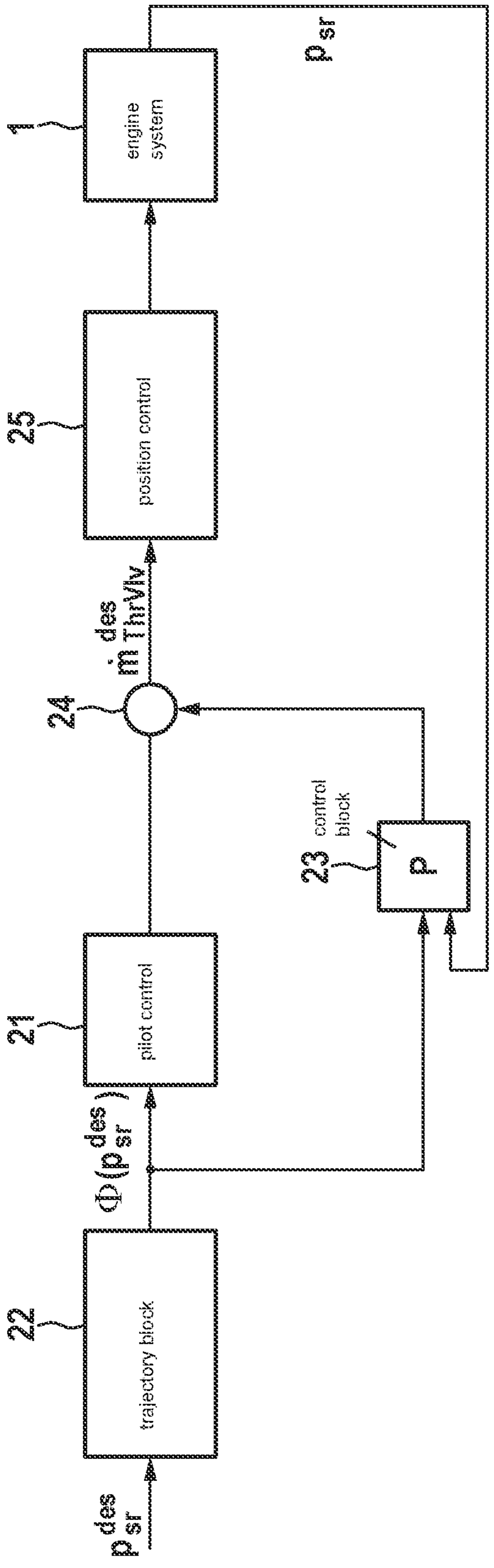
FIG. 2 shows a block diagram to illustrate a control of the throttle valve actuator based on a pressure-based control, according to an example embodiment of the present invention.

The charge control implemented in engine control device 10 is based on a control structure which is shown in FIG. 2 by way of example. The control structure includes a pilot control 21 for ascertaining the result of a first term, and a control block 23 for calculating the result of a second term.

The specification of setpoint mass flow $\dot{m}_{ThrVlv}{}^{des}$ for throttle valve 4 is suitably implemented into a position control of a downstream position control 25. To control the setpoint mass flow $\dot{m}_{ThrVlv}{}^{des}$ via throttle valve 4, a total function is provided with the pilot control and the control, which is indicated by the following equation.

$$\dot{m}^{des}_{ThrVlv} = k_{sr} \cdot \frac{d}{dt} p^{des}_{sr} +$$

-continued $$\left(p^{des}_{sr} - p_{rg}\right) \cdot fupsrl \cdot umsrln + \left(\frac{k_{sr}}{\tau^{des}} - fupsrl \cdot umsrln\right)\left(p^{des}_{sr} - p_{sr}\right)$$

A characteristic feature of this control is that it is not based on the charge but on the intake manifold pressure $p_{sr}$.

This equation considers the error dynamic $$\dot{e}_{sr} + \frac{1}{\tau^{des}} e_{sr} = 0$$

with $e_{sr} = p_{sr}{}^{des} - p_{sr}$ It then follows that:

$$\frac{d}{dt} p^{des}_{sr} - \frac{d}{dt} p_{sr} + \frac{1}{\tau^{des}}\left(\frac{p}{srdes} - p_{sr}\right) = 0$$

$$\Rightarrow \frac{d}{dt} p^{des}_{sr} - \frac{1}{k_{sr}}\left(\dot{m}^{des}_{ThrVlv} - rl \cdot umsrln\right) + \frac{1}{\tau^{des}}\left(p^{des}_{sr} - p_{sr}\right) = 0$$

$$\Rightarrow \frac{d}{dt} p^{des}_{sr} - \frac{1}{k_{sr}}\left(\dot{m}^{des}_{ThrVlv} - (p_{sr} - p_{rg}) \cdot fupsrl \cdot umsrln\right) + \frac{1}{\tau^{des}}\left(p^{des}_{sr} - p_{sr}\right) = 0$$

By a rearrangement, the above formula is obtained.

Accordingly, pilot control 21 supplies the result of $$\frac{1}{k_{sr}}\left(\dot{m}^{des}_{ThrVlv} - (p_{sr} - p_{rg}) \cdot fupsrl \cdot umsrln\right)$$

as a function of the variables fupsrl, umsrln, $k_{sr}$ defined at the outset, the setpoint intake manifold pressure $p_{sr}{}^{des}$, a predefined time constant $\tau^{des}$, and the actual intake manifold pressure $p_{sr}$.

To determine the setpoint mass flow $\dot{m}_{ThrVlv}{}^{des}$ to be set for throttle valve 4, instead of a setpoint intake manifold pressure $p_{sr}{}^{des}$, which may be defined by the setpoint air charge $rl_{des}$ as a function of engine parameters, it is determined according to a trajectory plan. The trajectory planning for setpoint intake manifold pressure $p_{sr}{}^{des}$ may be carried out in a trajectory block 22, for instance with the aid of a PTn filter with $n \geq 1$, so that a reduced dynamic on setpoint intake manifold pressure $p_{sr}{}^{des}$ is ensured that throttle valve actuator 5 is actually also able to follow. The corresponding setpoint variable $\phi(p_{sr}{}^{des})$ results from the application of the function $\phi(\bullet)$. The modified equation therefore results from the above equation $$\dot{m}^{des}_{ThrVlv} = k_{sr} \cdot \frac{d}{dt} \phi\left(p^{des}_{sr}\right) +$$

$$\left(\phi\left(p^{des}_{sr}\right) - p_{rg}\right) \cdot fupsrl \cdot umsrln + \left(\frac{k_{sr}}{\tau^{des}} - fupsrl \cdot umsrln\right)\left(\phi\left(p^{des}_{sr}\right) - p_{sr}\right)$$

where, instead of setpoint intake manifold pressure $p_{sr}{}^{des}$, a modified setpoint intake manifold pressure is inserted as a function $\phi(p_{sr}{}^{des})$ depending on the setpoint intake manifold pressure. The function $\phi(\bullet)$ corresponds to a transfer function of a PTn filter for mapping the restricted dynamic of an adjustment of throttle valve 4. On this basis, it is then also possible to calculate the derivation $p_{sr}{}^{des}$ in an analytical and precise manner, and further discretization errors in the calculation of the derivation are avoided.

A PTn filter is able to be represented by a differential equation that is solved by a time function. This time derivation may in turn be derived in an analytical and precise manner.

This avoids the inaccuracies that would result by the calculation with the aid of a differential quotient, for example.

The result of the calculation of the second term in control block 23 is then applied to the result of the first term ascertained by pilot control 21 according to the above rule in an addition block 24. Control block 23 is particularly developed as a proportional controller, and the second term as a proportional controller may perform a corrective intervention for the first term according to $$\left(\frac{k_{sr}}{\tau^{des}} - fupsrl \cdot umsrln\right)\left(p_{sr}^{des} - p_{sr}\right).$$

The sum of the results of the two terms is conveyed to a downstream position control 25 for throttle valve 4 as a setpoint specification. Position control 25 is developed in a conventional manner.

Actual intake manifold pressure $p_{sr}$ results from a measurement with the aid of intake manifold pressure sensor 11 or by suitable mathematical modeling.

The time constant of the proportional controller $\tau^{des}$ is usually selected in such a way that balancing is achieved between the most rapid control possible and the avoidance of oscillations on actual intake manifold pressure $p_{sr}$. Typically, the time constant $\tau^{des}$ is a function of the current control deviation. For instance, the time constant $\tau^{des}$ may be determined via a configurable characteristic curve or, if a further input variable such as the engine speed is to be considered, a configurable program map.

To calm the resulting setpoint mass flow $\dot{m}_{ThrVlv}{}^{des}$ for throttle valve 4 in a stationary manner, that is, to avoid that fluctuations of the actual mass flow lead to a steady change in the setpoint value, the conversion factor fupsrl and the partial pressure $p_{rg}$ in the corresponding term of the above equation can be calculated on the basis of setpoint camshaft angles instead of actual camshaft angles.

The setpoint values for the camshaft positions generally come from program map structures which are a function of the setpoint charge and engine speed, in particular. Thus, they are very stable for a specific operating point.

The actual values of the camshaft positions are able to be determined by a sensor. Since systems featuring a camshaft adjustment involve hydraulic systems, small movements in the system are common here also in stationary operating points. They are detected, and subsequently cause larger variations on the variables of the conversion factor fupsrl and the partial pressure $p_{rg}$.

What is claimed is:

1. A method for operating an internal combustion engine based on a control of a supplied fresh air quantity, the method comprising the following steps:

determining a setpoint mass flow for a throttle valve using a differential equation which is a function of a modified setpoint intake manifold pressure and an actual intake manifold pressure, wherein the modified setpoint intake manifold pressure is calculated using a predefined setpoint intake manifold pressure and a transfer function, and the actual intake manifold pressure is measured using an intake manifold pressure sensor; and implementing an adjustment of the throttle valve for the control of the supplied fresh air quantity as a function of the setpoint mass flow.

2. The method as recited in claim 1, wherein the transfer function takes a limited dynamic of the adjustment of the throttle valve into account.

3. The method as recited in claim 1, wherein the differential equation takes a linear error dynamic according to $$\dot{e}_{sr} + \frac{1}{\tau^{des}} e_{sr} = 0$$

into account, wherein $e_{sr}$ is a control deviation, which is a function of a setpoint intake manifold pressure and an actual intake manifold pressure, and $\tau^{des}$ is a predefined time constant.

4. The method as recited in claim 1, wherein the differential equation is a function of a partial pressure of the internal residual gas in a combustion chamber of a cylinder and of a conversion factor of a pressure into a charge, and wherein at least one of the partial pressure of the internal residual gas or the conversion factor is determined as a function of at least one of an intake valve opening instant or a discharge valve closing instant.

5. The method as recited in claim 1, wherein the transfer function models a PTn behavior, with n>=1, and has a time constant, which is selected in such a way that it defines a dynamic that is equal to or less than a maximum dynamic of the adjustment of the throttle valve by a throttle valve actuator for the internal combustion engine.

6. The method as recited in claim 1, wherein the adjustment of the throttle valve for the control of the supplied fresh air quantity is implemented using a pilot control and a control as a function of a control deviation between the setpoint intake manifold pressure and an actual intake manifold pressure.

7. A device for operating an internal combustion engine based on a control of a supplied fresh air quantity, the device configured to:

determine a setpoint mass flow for a throttle valve using a differential equation which is a function of a modified setpoint intake manifold pressure and an actual intake manifold pressure, wherein the modified setpoint intake manifold pressure is calculated using a predefined setpoint intake manifold pressure and a transfer function, and the actual intake manifold pressure is measured using an intake manifold pressure sensor; and implement an adjustment of the throttle valve for the control of the supplied fresh air quantity as a function of the setpoint mass flow.

8. A non-transitory machine-readable memory medium on which are stored instructions for operating an internal combustion engine based on a control of a supplied fresh air quantity, the instructions, when executed by a data processing device, causing the data processing device to perform the following steps:

determining a setpoint mass flow for a throttle valve using a differential equation which is a function of a modified setpoint intake manifold pressure and an actual intake manifold pressure, wherein the modified setpoint intake manifold pressure is calculated using a predefined setpoint intake manifold pressure and a transfer function, and the actual intake manifold pressure is measured using an intake manifold pressure sensor; and implementing an adjustment of the throttle valve for the control of the supplied fresh air quantity as a function of the setpoint mass flow.

* * * * *